(12) United States Patent
Katayama et al.

(10) Patent No.: US 8,510,541 B2
(45) Date of Patent: Aug. 13, 2013

(54) INFORMATION PROCESSING APPARATUS AND METHOD THAT ESTABLISHES COMMUNICATION AND OUTPUTS A BLACK-SCREEN SIGNAL DURING A PREDICTED POWER-ON PERIOD

(75) Inventors: Akira Katayama, Tokyo (JP); Yoshinori Ogaki, Chiba (JP); Makoto Korehisa, Kanagawa (JP); Kayo Watanabe, Kanagawa (JP)

(73) Assignee: Sony Corporation (JP)

( * ) Notice: Subject to any disclaimer, the term of this patent is extended or adjusted under 35 U.S.C. 154(b) by 176 days.

(21) Appl. No.: 13/211,392

(22) Filed: Aug. 17, 2011

(65) Prior Publication Data

US 2012/0054480 A1 Mar. 1, 2012

(30) Foreign Application Priority Data

Aug. 25, 2010 (JP) ................. P2010-188897

(51) Int. Cl.
*G06F 15/177* (2006.01)
(52) U.S. Cl.
USPC .............. 713/1; 369/53.37; 386/230
(58) Field of Classification Search
USPC .............. 369/53.37; 386/230; 713/1
See application file for complete search history.

(56) References Cited

U.S. PATENT DOCUMENTS

| 7,787,343 B2* | 8/2010 | Matsushita et al. ........ 369/53.45 |
| 2009/0041438 A1* | 2/2009 | Kuno ............................ 386/126 |

FOREIGN PATENT DOCUMENTS

| JP | 7-212678 A | 8/1995 |
| JP | 2008-131360 A | 6/2008 |

* cited by examiner

*Primary Examiner* — Albert Wang
(74) *Attorney, Agent, or Firm* — Lerner, David, Littenberg, Krumholz & Mentlik, LLP (57) ABSTRACT

An information processing apparatus includes a main switch configured to receive on/off-instructions for power supply from a user, a predicting section configured to predict a time period during which a possibility that the main switch receives an on-instruction is high, a connector section capable of connecting an electronic apparatus including a display screen, a communication establishing section configured to execute processing to establish a state allowing communication with an electronic apparatus connected to the connector section, a black-screen output section capable of outputting a black-screen signal to the electronic apparatus via the connector section, and a startup section configured to start, during a time period predicted by the predicting section and when the main switch is off, the communication establishing section and the black-screen output section, and to cause the black-screen output section to continue to output the black-screen signal until the main switch is turned on.

6 Claims, 10 Drawing Sheets

| Date | Day of week | 0~1 | 1~2 | 2~3 | 3~4 | 4~5 | 5~6 | 6~7 | 7~8 | 8~9 | 9~10 | 10~11 | 11~12 | 12~13 | 13~14 | 14~15 | 15~16 | 16~17 | 17~18 | 18~19 | 19~20 | 20~21 | 21~22 | 22~23 | 23~24 |
|---|---|---|---|---|---|---|---|---|---|---|---|---|---|---|---|---|---|---|---|---|---|---|---|---|---|
| | Mon | | | | | | | | | | | | | | | | | | | | | | | | |
| | Tue | | | | | | | | | | | | | | | | | | | | | | | | |
| | Wed | | | | | | | | | | | | | | | | | | | | | | | | |
| | Thu | | | | | | | | | | | | | | | | | | | | | | | | |
| | Fri | | | | | | | | | | | | | | | | | | | | | | | | |
| | Sat | | | | | | | | | | | | | | | | | | | | | | | | |
| | Sun | | | | | | | | | | | | | | | | | | | | | | | | |

FIG.7C $$S_n = ((((M \times \frac{1}{2}) + M) \times \frac{1}{2}) + M) + \cdots$$

$$= M + \frac{M}{2} + \frac{M}{4} + \frac{M}{8} + \cdots + \frac{M}{2^n}$$

$$= M \sum_{m=0}^{n} \frac{1}{2^m}$$

∴ where n is replaced by ∞

$$S_\infty = M \sum_{m=0}^{\infty} \frac{1}{2^m} = \lim_{n \to \infty} M \sum_{m=0}^{n} \frac{1}{2^m}$$

$$= \lim_{n \to \infty} M \frac{1 \cdot \left(1 - \left(\frac{1}{2}\right)^n\right)}{1 - \frac{1}{2}}$$

$$= \lim_{n \to \infty} 2M \left(1 - \frac{1}{2^n}\right)$$

$$S_n = M \times \frac{1}{2^n}$$

$$10 > M \times \frac{1}{2^n}$$

$$2^n > \frac{M}{10}$$

$$n > \log_2 \frac{M}{10} = \frac{\ln \frac{M}{10}}{\ln 2}$$

INFORMATION PROCESSING APPARATUS AND METHOD THAT ESTABLISHES COMMUNICATION AND OUTPUTS A BLACK-SCREEN SIGNAL DURING A PREDICTED POWER-ON PERIOD

CROSS-REFERENCE TO RELATED APPLICATION

The present application claims priority from Japanese Patent Application No. JP 2010-188897 filed in the Japanese Patent Office on Aug. 25, 2010, the entire content of which is incorporated herein by reference.

BACKGROUND

The present disclosure relates to an information processing apparatus which may output a digital video signal to an external electronic apparatus, and an information processing method.

In general, an AV (Audio/Visual) equipment such as a Blu-ray Disc (registered trademark, hereinafter referred to as BD) player or the like is connected to an external electronic apparatus such as a digital television apparatus to be used. The AV equipment is connected to an external electronic apparatus via a digital image input/output interface such as an HDMI (High-Definition Multimedia Interface), for example, and may output a digital video signal to the external electronic apparatus. The external electronic apparatus outputs a digital image according to the digital video signal input from the AV equipment via the HDMI.

Under such a digital-image input/output control, after a main switch of an AV equipment is turned on, it is necessary to execute two-way certification processing between the AV equipment and an external electronic apparatus, and to execute processing to establish a state allowing two-way communication. The processing to establish a state allowing two-way communication includes generating a key necessary for a ciphered communication, exchanging the key, and the like. Therefore, there is a problem that, after a main switch of an AV equipment is turned on, a relatively long time is required as a startup time until an electronic apparatus outputs a digital image. The relatively long time includes a time necessary for the above-mentioned processing required to establish a state allowing two-way communication.

As a method of reducing such a startup time, there is known a technology in which a power is previously supplied to an apparatus before a main switch is turned on (for example, see Japanese Patent Application Laid-open No. H7-212678, hereinafter referred to as Patent Document 1). According to Patent Document 1, in an analog television apparatus, circuits of a tuner system, a deflection system, a heater system, and the like, whose rates of rise are slow, are previously energized for a predetermined time period in a time when the main switch is off. The predetermined time period is a time period in which a use frequency of the apparatus by a user is high. As a method for determining a time period in which a use frequency of the apparatus is high, there is known the following method. That is, a method for determining a time period in which a use frequency is high based on information on a time period and a day of a week that a main switch is on (for example, see Japanese Patent Application Laid-open No. 2008-131360, hereinafter referred to as Patent Document 2) is known.

According to the method of Patent Document 1, in an analog television apparatus, if circuits of a tuner system, a deflection system, a heater system, and the like, whose rates of rise are slow, are previously energized, an analog-image output control may be executed immediately after a main switch is turned on. However, in a digital-image input/output control such as HDMI, complicated processing to establish a state allowing two-way communication between an input-side system and an output-side system may be executed. Therefore, even if circuits whose rates of rise are slow are previously energized, processing to establish a state allowing communication may be executed after a main switch is turned on. So, after the main switch is turned on, it still takes time until an image is output.

Further, according to the method of Patent Document 2, if a user uses an apparatus everyday, accurate use-frequency information may be obtained for each day of a week. However, it is not always true that a time-varying change of usage inclination and the like are appropriately reflected on use frequency information. An example of the time-varying change of usage inclination is a case where a user does not use an apparatus for a long time.

SUMMARY

In view of the above-mentioned circumstances, it is desirable to provide an information processing apparatus which may reduce an apparent startup time significantly, and an information processing method.

According to an embodiment of the present disclosure, there is provided an information processing apparatus, including a main switch configured to receive on/off-instructions for power supply from a user, a predicting section configured to predict a time period during which a possibility that the main switch receives an on-instruction is high, a connector section capable of connecting an electronic apparatus including a display screen, a communication establishing section configured to execute processing to establish a state allowing communication with an electronic apparatus connected to the connector section, a black-screen output section capable of outputting a black-screen signal to the electronic apparatus via the connector section, and a startup section configured to start, during a time period predicted by the predicting section and when the main switch is off, the communication establishing section and the black-screen output section, and to cause the black-screen output section to continue to output the black-screen signal until the main switch is turned on.

According to the embodiment of the present disclosure, during a time period in which a possibility that the main switch receives an on-instruction is high and when the main switch is off, processing to establish a state allowing communication with a connected electronic apparatus is executed. As a result, after the main switch actually receives an on-instruction, communication between the information processing apparatus and the electronic apparatus may be started immediately. Further, during a time period from the establishment of the state allowing communication between the information processing apparatus and the electronic apparatus to actually turning on the main switch, a black-screen signal is output to the electronic apparatus. Therefore, during operation of the information processing apparatus, it appears that the information processing apparatus is not operated through the display of the electronic apparatus. When the main switch is turned on, the output of the black-screen signal is stopped. Further, instead of the black screen, for example, an original image screen is output to the electronic apparatus. Therefore, the apparent startup speed may be improved significantly.

The predicting section may be configured to manage an on/off operation history of the main switch, and to predict, based on the history, a time period during which a possibility that the main switch receives an on-instruction is high.

Therefore, a time period during which a possibility that the main switch receives an on-instruction is high may be predicted more accurately. Further, needless setting of a state allowing communication with a connected apparatus and a state outputting a black-screen signal may be reduced. Further, power consumption may be reduced.

The predicting section may be configured to calculate a value corresponding to a frequency that the main switch is turned on for at least each day of a week, to generate a history including the calculation result, and to predict, based on the history, a time period during which a possibility that the main switch receives an on-instruction is high.

The predicting section may be configured to calculate a value corresponding to a frequency that the main switch is turned on for each time period of each day of a week, to generate a history including the calculation result, and to predict, based on the history, a time period during which a possibility that the main switch receives an on-instruction is high.

Therefore, a time period during which a possibility that the main switch receives an on-instruction is high may be predicted for a shorter time unit. Further, needless setting of a state allowing communication with a connected apparatus and a state outputting a black-screen signal may be reduced to a minimum. Further, power consumption may be reduced more efficiently.

The predicting section may be configured to calculate a value corresponding to a frequency for each time period of each day of a week, taking a difference between a date and time that the main switch was turned on last time and a date and time that the main switch was turned on lastly into consideration.

For example, when a difference between a date and time that the main switch was turned on last time and a date and time that the main switch was turned on lastly is equal to or more than a reference value, the predicting section updates a value corresponding to a frequency for each time period of a day of a week by subtraction of a value corresponding to a frequency for each time period of a day of a week. Therefore, with respect to a case where the main switch was not turned on for a long time and the like, specifically, a more appropriate value may be obtained as a value corresponding to a frequency for each time period.

According to an embodiment of the present disclosure, there is provided an information processing method, including predicting, by a predicting section, a time period during which a possibility that a main switch receives an on-instruction is high, executing, during a predicted time period and when the main switch is off, by a communication establishing section, processing to establish a state allowing communication with a connected electronic apparatus, outputting, by a black-screen output section, a black-screen signal to the electronic apparatus, and causing the black-screen output section to continue to output the black-screen signal until the main switch is turned on.

According to the embodiments of the present disclosure, an apparent startup time of an information processing apparatus connected to an external apparatus via a digital image input/output interface may be reduced significantly.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment (Hardware Configuration of AV Equipment)

Figure 1:
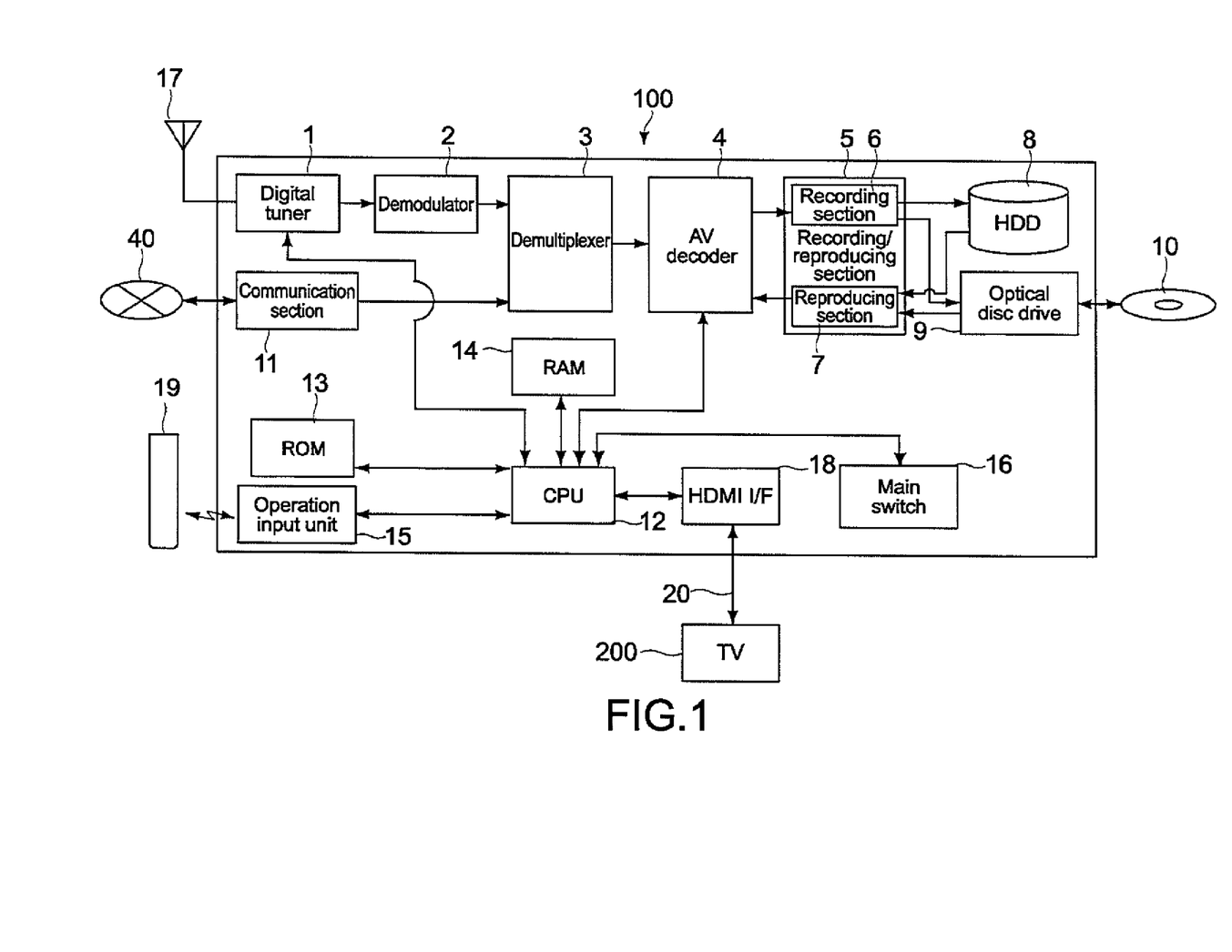
FIG. 1 is a block diagram showing a hardware configuration of an AV equipment according to a first embodiment.

FIG. 1 is a block diagram showing a hardware configuration of an AV equipment being an information processing apparatus according to a first embodiment of the present disclosure.

As shown in FIG. 1, an AV equipment 100 of this embodiment is connectable to a digital television apparatus 200 (hereinafter, referred to as TV 200) being an external electronic apparatus having a display screen via an HDMI cable 20.

The AV equipment 100 of this embodiment includes a digital tuner 1, a digital demodulator 2, a demultiplexer 3, an AV decoder 4, a recording/reproducing section 5, an HDD (Hard Disk Drive) 8, an optical disc drive 9, a communication section 11, a CPU (Central Processing Unit) 12, a ROM (Read Only Memory) 13, a RAM (Random Access Memory) 14, an operation input unit 15, a main switch 16, an antenna 17, and an HDMI interface 18.

Controlled by the CPU 12, the digital tuner 1 selects a specific channel of digital broadcasting via the antenna 17, and receives a broadcast signal including program data. The broadcast signal is, for example, an MPEG stream encoded in MPEG-2 TS format, but is not limited to this format. The digital demodulator 2 demodulates the modulated broadcast signal.

The demultiplexer 3 separates a multiplexed broadcast signal into a video signal and a sound signal. The AV decoder 4 decodes the compressed video signal and sound signal separated by the demultiplexer 3, and outputs the decoded video signal and sound signal to the HDMI interface 18 via the CPU 12.

The recording/reproducing section 5 includes a recording section 6 and a reproducing section 7. The recording section 6 temporarily stores the input video signal and sound signal decoded by the AV decoder 4, outputs the signals to the HDD 8 and the optical disc drive 9 while controlling timings and data amounts, and causes them to record the signals. The reproducing section 7 reads out a video signal and a sound signal of video contents recorded in the HDD 8 and an optical disc, outputs the signals to the AV decoder 4 while controlling timings and data amounts, and causes the AV decoder 4 to reproduce the signals.

The HDD 8 stores a program received via the digital tuner 1 and video contents received by the communication section 11 via a network 40 such as the Internet in an internal hard disk. Further, the HDD 8 stores, in addition to the above, any contents such as various video contents input from a digital camera and various recording media via various interfaces (not shown) and still-image contents. When those stored contents are reproduced, the HDD 8 reads out the data from the above-mentioned hard disk, and outputs the data to the recording/reproducing section 5. Further, the HDD 8 may store various programs such as applications, other data, and the like. Instructed by the CPU 12, those programs and data are read out from the HDD 8 and developed in the RAM 14 when they are executed and referred to.

The optical disc drive 9 has an insertion unit into which an optical disc 10 may be inserted. Similar to the above-mentioned HDD 8, the optical disc drive 9 may record various data such as the above-mentioned program contents in the inserted optical disc 10, and further, read out record data. As the optical disc 10, for example, a BD (BD-ROM), a DVD, a CD, or the like may be used. The above-mentioned various programs may be recorded in transportable recording media such as the optical disc 10, and may be installed in the AV equipment 100 by the optical disc drive 9.

The communication section 11 is a network interface connected to the above-mentioned network 40 and exchanging data with apparatuses in the network 40 by using a protocol such as TCP/IP (Transmission Control Protocol/Internet Protocol).

The CPU 12 accesses to the RAM 14 and the like as necessary, and controls overall processing of the respective blocks of the AV equipment 100. An example of the processing is data record-and-reproduce processing by the recording/reproducing section 5.

The ROM 13 is a nonvolatile memory in which firmware such as an OS (Operating System) executed by the CPU 12, programs, and various parameters is fixedly stored. The RAM 14 is a memory used as a work area for the CPU 12 and the like, and temporarily stores an OS, programs, processed data, and the like.

The operation input unit 15 inputs various set values and instructions operated by a user from, for example, a remote control unit 19 (hereinafter, referred to as remote control 19) including a plurality of keys, and outputs them to the CPU 12. As a matter of course, the operation input unit 15 may be structured by a keyboard or a mouse connected to the AV equipment 100, switches mounted on the AV equipment 100, or the like, not the remote control 19. The main switch 16 receives power-supply on/off instructions from a user.

The HDMI interface 18 is connectable to the TV 200 via the HDMI cable 20. The HDMI interface 18 encrypts a video signal and a sound signal supplied from the AV decoder 4, and outputs the encrypted video signal and sound signal to the TV 200.

Detailed description on the hardware configuration of the TV 200 is omitted. The TV 200 includes minimum hardware components to decrypt a video signal and a sound signal output from the AV equipment 100 via the HDMI cable 20, to decode them, and to reproduce them.

(Functional Structure of AV Equipment)

Figure 2:
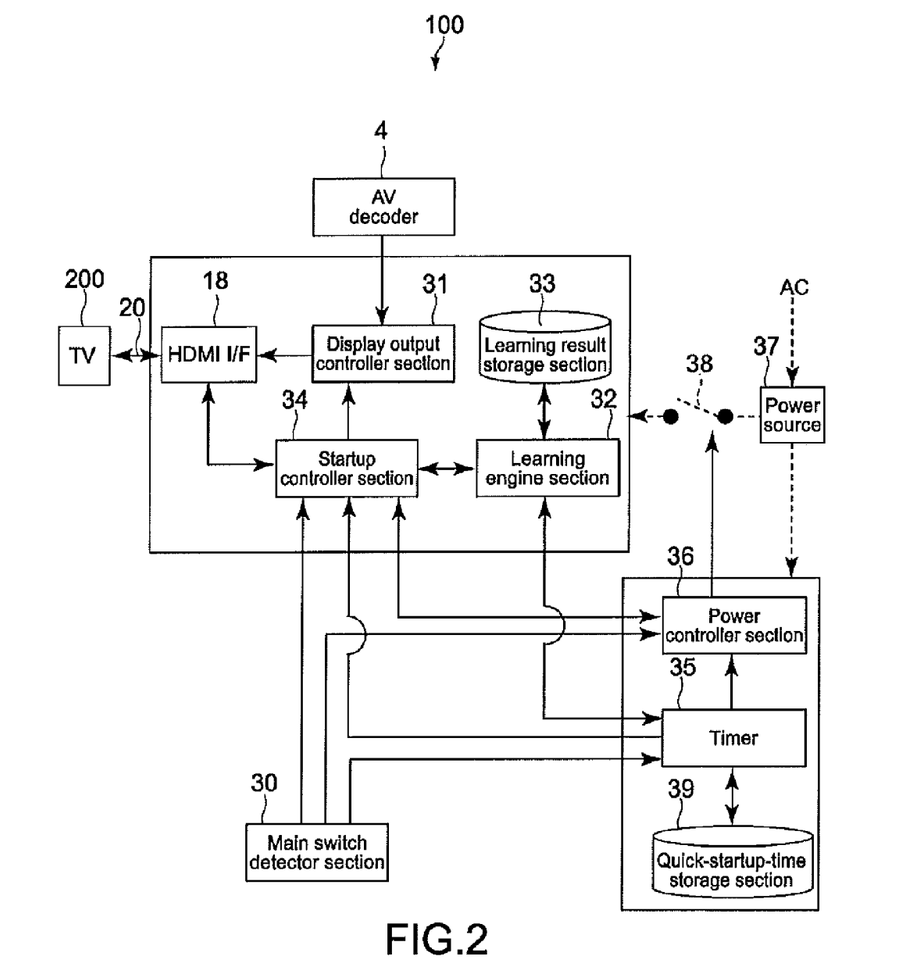
FIG. 2 is a block diagram showing a functional structure of the AV equipment.

FIG. 2 is a block diagram showing a functional structure of the AV equipment 100.

The AV equipment 100 includes a main switch detector section 30, a display output controller section 31 (black-screen output section), a learning engine section 32 (predicting section), a learning result storage section 33, a startup controller section 34 (startup section), a timer 35, a power controller section 36, a quick-startup-time storage section 39, and the HDMI interface 18 (connector section, communication establishing section).

The main switch detector section 30, the display output controller section 31, the learning engine section 32, the startup controller section 34, the timer 35, and the power controller section 36 are software blocks implemented by the CPU 12 and programs. The learning result storage section 33 and the quick-startup-time storage section 39 are, for example, set on a nonvolatile storage device such as the HDD 8.

The main switch detector section 30 detects on/off states of the main switch 16 for receiving power-supply on/off instructions from a user, notifies the startup controller section 34 and the power controller section 36 of a detection result, and executes other processing.

The timer 35 measures the present date and time. The quick-startup-time storage section 39 is a section storing, as quick startup time, information on the time when the AV equipment 100 is operated irrespective of an operation of the main switch 16. The timer 35 refers to the quick-startup-time storage section 39, and determines whether the present date and time coincide with the quick startup time or not. In a case where the present date and time coincide with the quick startup time, the timer 35 transmits a startup instruction to the startup controller section 34, and transmits a power-on-instruction to the power controller section 36.

The startup controller section 34 starts the display output controller section 31 and the learning engine section 32 based on a startup instruction from the timer 35, and executes other processing.

The power controller section 36 switches on/off of supplying a rated power to the respective sections on a board from a power source 37 based on instructions from the timer 35.

The display output controller section 31 generates a black-screen signal to supply it to the HDMI interface 18, obtains a video signal and a sound signal from the AV decoder 4 to supply it to the HDMI interface 18, and executes other processing.

The HDMI interface 18 is connectable to the TV 200 being an external electronic apparatus having a display screen. The HDMI interface 18 executes processing to establish a state allowing communication with the connected TV 200, encrypts a black-screen signal, a video signal, and a sound signal input from the display output controller section 31 to output them to the TV 200, and executes other processing.

The learning engine section 32 records a history of on/off operations of the main switch 16 in a learning manager table 50 set in the learning result storage section 33. The learning engine section 32 predicts a time period during which a possibility that the main switch 16 receives an on-instruction is high based on the learning manager table 50, notifies the timer 35 of, for example, a start time of the time period as a quick startup time, and executes other processing.

(Behaviors of AV Equipment)

Next, operations of the AV equipment 100 structured as described above will be described. The description will be made in the following order.

1. Power-on operation of the AV equipment 100
2. Power-off operation of the AV equipment 100
3. Learning operation of the AV equipment 100

(1. Power-on Operation of the AV Equipment 100)

Figure 3:
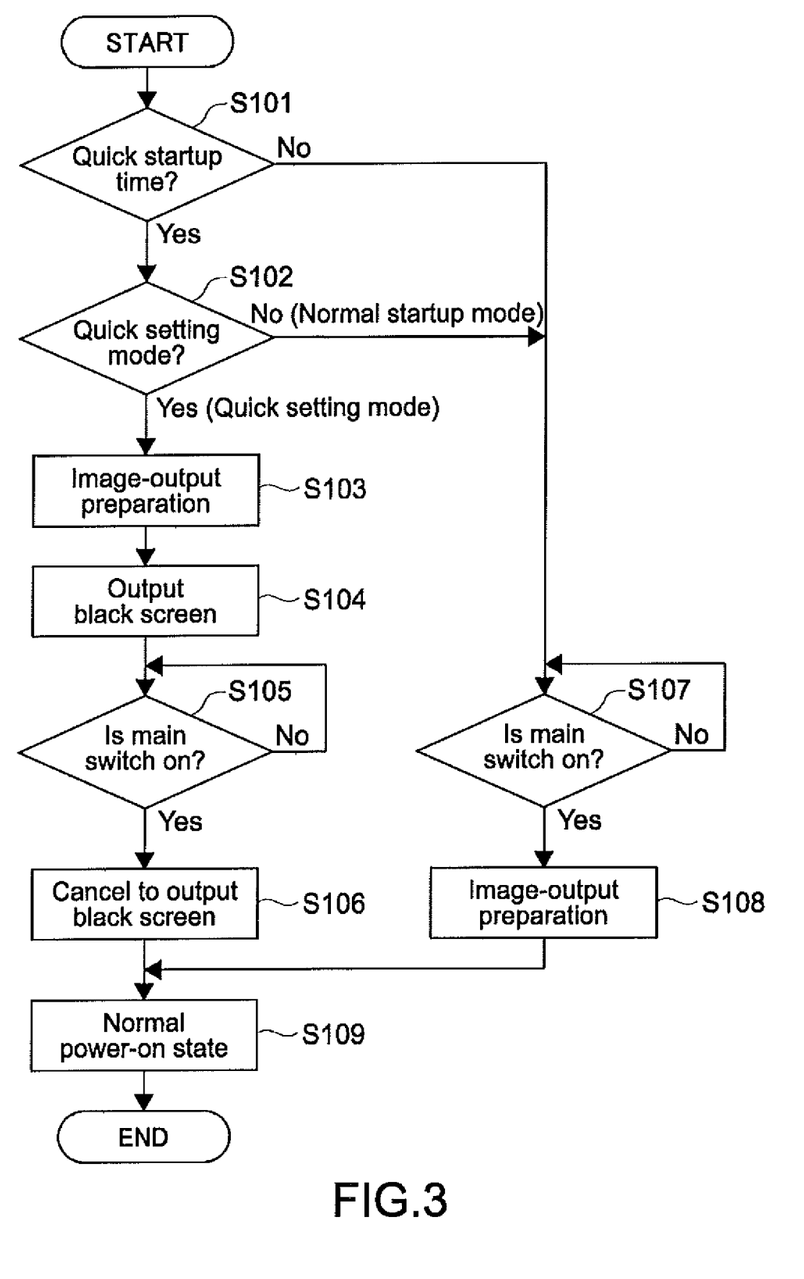
FIG. 3 is a flowchart showing a power-on operation of the AV equipment.

FIG. 3 is a flowchart showing the power-on operation of the AV equipment.

As a precondition of the operation, it is assumed that the AV equipment 100 is energized, the main switch 16 is turned off, and a power is supplied only to the timer 35, the power controller section 36, and the quick-startup-time storage section 39.

The timer 35 refers to the quick-startup-time storage section 39, and determines whether the present date and time coincide with a quick startup time set in the quick-startup-time storage section 39 or not (Step S101). Determining that the present date and time coincide with the quick startup time (Step S101, Yes), the timer 35 transmits a startup instruction to the startup controller section 34, and transmits a power-on-instruction to the power controller section 36. Based on the power-on-instruction from the timer 35, the power controller section 36 switches on a switch 38. As a result, the power source 37 supplies power to the respective sections on the board. As a result, the startup controller section 34 is operable.

Based on the startup instruction from the timer 35, the startup controller section 34 determines a presently-set standby mode (Step S102). There are a quick setting mode and a normal startup mode as standby modes, and one of them is previously set by a user, for example. Here, the "quick setting mode" is a startup mode with which the state allowing communication with the TV 200 is established and a black screen is output on the TV 200 before the main switch 16 of the AV equipment 100 is turned on, and an original video signal is output to the TV 200 instead of the black screen when the main switch 16 is turned on, to thereby enable an apparent quick startup. Meanwhile, the "normal startup mode" is a typical startup mode with which processing to establish the state allowing communication with the TV 200 is executed after a main switch of the AV equipment 100 is turned on, and a video signal is output to the TV 200 after that.

Determining that the normal startup mode is set (Step S102, No), the startup controller section 34 transmits a power-off-instruction to the power controller section 36. The power controller section 36 switches off the switch 38 based on the power-off-instruction from the startup controller section 34. As a result, power-supply from the power source 37 to the respective sections on the board is stopped.

Meanwhile, determining that the quick setting mode is set (Step S102, Yes), the startup controller section 34 requests execution of processing to establish the state allowing communication with a connected apparatus of the HDMI interface 18. According to the request, the HDMI interface 18 executes the processing to establish the state allowing communication with the TV 200 as image-output preparation (Step S103). Specifically, under the HDMI standard, the AV equipment 100 reads out EDID (Extended Display Identification Data) from the TV 200. EDID is an ID unique to the TV 200 for transmitting a model name of the TV 200 and a set value to the AV equipment 100. Then, the AV equipment 100 certifies the TV 200 by using HDCP (High-bandwidth Digital Content Protection), and sets an original cipher common to the AV equipment 100 and the TV 200 used for encrypting and decrypting a signal exchanged between the AV equipment 100 and the TV 200.

Completing the above-mentioned image-output preparation, the HDMI interface 18 notifies the startup controller section 34 that the image-output preparation is completed. Receiving the image-output preparation completion notification from the HDMI interface 18, the startup controller section 34 instructs the display output controller section 31 to start outputting a black-screen signal. Receiving the black-screen-signal output-start instruction from the startup controller section 34, the display output controller section 31 generates the black-screen signal and supplies it to the HDMI interface 18 (Step S104). Here, the "black-screen signal output" is that all the RGB output from the AV equipment 100 are zero. Alternatively, the "black-screen signal output" may be output of a signal having a value that makes the AV equipment 100 in the state apparently similar to a state where the AV equipment 100 is not started. When the black screen is displayed, a user recognizes that the AV equipment 100 is in a state similar to the state where it is not started.

The HDMI interface 18 encrypts a black-screen signal input from the display output controller section 31 by using the cipher set in the image-output preparation, and transmits it to the TV 200 via the HDMI interface 18. Note that, in a case where the power source of the TV 200 is turned off, the AV equipment 100 may execute power control of the TV 200 by using CEC (Consumer Electronics Control) or the like via the HDMI cable 20, and turn on the power source of the TV 200.

The TV 200 decrypts the video signal input from the AV equipment 100 by using the cipher set in the image-output preparation, decodes it to reproduce a black screen, and displays it on a screen. As a result, although the state allowing communication between the AV equipment 100 and the TV 200 is established, a user recognizes the AV equipment 100 as if it is in the unstarted state.

After that, if the main switch detector section 30 detects that the main switch 16 is turned on (Step S105), the main switch detector section 30 notifies the startup controller section 34 of the detection result. Receiving the notification (Step S105, Yes), the startup controller section 34 outputs an instruction to cancel the black-screen output to the display output controller section 31.

Based on the instruction to cancel the black-screen output from the startup controller section 34, the display output controller section 31 cancels to output the black screen (Step S106), obtains a video signal and a sound signal with regard to the latest channel information from the AV decoder 4, and outputs them to the HDMI interface 18. The HDMI interface 18 encrypts the video signal and the sound signal input from the display output controller section 31 by using the cipher set in the image-output preparation, and transmits the encrypted video signal and sound signal to the TV 200 (Step S109).

The TV 200 decrypts the video signal and the sound signal input from the AV equipment 100 by using the cipher set in the image-output preparation, decodes them, and reproduces them. As a result, a video and a sound that a user may watch and listen are output from the AV equipment 100 for the first time. As described above, after the main switch 16 is turned on, the state that a user may watch and listen a video and a sound is established without spending a time required for processing necessary to establish the state allowing communication between the AV equipment 100 and the TV 200. Therefore, the apparent startup speed is improved significantly.

Meanwhile, in Step S101, in a case where the present date and time measured by the timer 35 does not coincide with the quick startup time (Step S101, No), the timer 35 does not output the power-on-instruction to the power controller section 36. So, power is not supplied to the respective sections on the board from the power source 37. In this state or in a state where power-supply to the respective sections on the board is stopped during the normal startup mode (Step S102, No), when the main switch detector section 30 detects that the main switch is turned on (Step S107, Yes), the main switch detector section 30 gives a startup instruction to the startup controller section 34, and transmits a power-on-instruction to the power controller section 36. As a result, power-supply from the power source 37 to the respective sections on the board is started, and startup processing is executed in the following normal order.

That is, after the power-supply from the power source 37 to the respective sections on the board is started, based on the startup instruction from the main switch detector section 30, the startup controller section 34 requests execution of processing to establish communication with a connected apparatus of the HDMI interface 18. Based on the request, the HDMI interface 18 executes processing to establish the state allowing communication with the TV 200 as the image-output preparation (Step S108). When the HDMI interface 18 completes the image-output preparation, the HDMI interface 18 notifies the startup controller section 34 that the image-output preparation is completed. Based on the notification, the startup controller section 34 instructs the display output controller section 31 to start to output the normal video and sound.

Receiving the instruction to start to output the normal video and sound, the display output controller section 31 obtains a video signal and a sound signal of the latest channel information from the AV decoder 4, and supplies them to the HDMI interface 18. The HDMI interface 18 encrypts the video signal and the sound signal input from the display output controller section 31 by using the cipher set in the image-output preparation, and outputs the encrypted video signal and sound signal to the TV 200 (Step S109).

(2. Power-Off Operation of AV Equipment)

Figure 4:
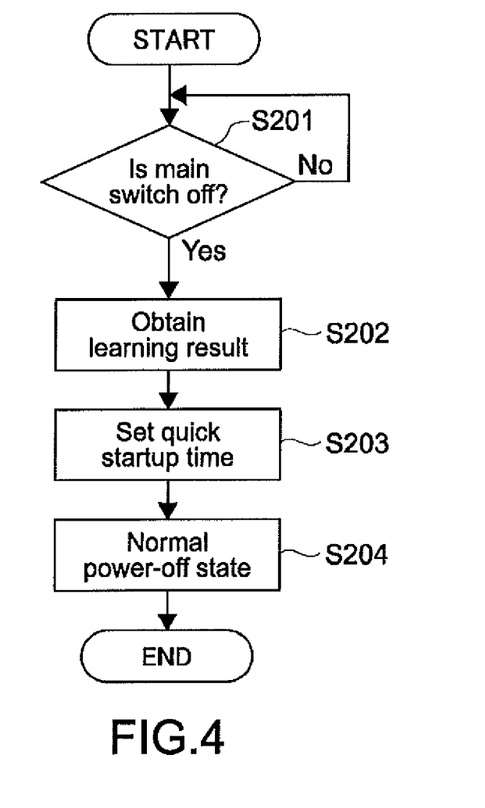
FIG. 4 is a flowchart showing a power-off operation of the AV equipment.

FIG. 4 is a flowchart showing the power-off operation of the AV equipment.

When the AV equipment is turned off, a quick startup time is determined as follows, and is set in the timer 35.

Detecting that the main switch 16 is turned off (Step S201, Yes), the main switch detector section 30 notifies the startup controller section 34 of a detection result. Based on the notification from the main switch detector section 30, the startup controller section 34 instructs the learning engine section 32 to read the learning manager table 50. Note that the structure and the like of the learning manager table 50 will be described later in detail.

Receiving the instruction from the startup controller section 34, the learning engine section 32 reads out the learning manager table 50 from the learning result storage section 33 (Step S202). Based on the read-out learning manager table 50, the learning engine section 32 predicts a time period in which the main switch 16 receives an on-instruction, and notifies the timer 35 of, for example, a start time of the predicted time period as a quick startup time.

Receiving the quick-startup-time notification from the learning engine section 32, the timer 35 sets the quick startup time in the quick-startup-time storage section 39 (Step S203). Specifically, the timer 35 writes the notified quick startup time in the quick-startup-time storage section 39, and notifies the learning engine section 32 that setting of the quick startup time is completed.

Receiving the notification that setting of the quick startup time is completed from the timer 35, the learning engine section 32 notifies the startup controller section 34 that setting of the quick startup time is completed. Receiving the notification from the learning engine section 32, the startup controller section 34 instructs the power controller section 36 to turn off the power. Based on the instruction, the power controller section 36 switches off the switch 38. As a result, power-supply from the power source 37 to the respective sections on the board is stopped (Step S204).

(3. Learning Operation of AV Equipment)

"Learning operation" is processing of predicting a time period during which a possibility that the main switch 16 receives an on-instruction is high based on an on/off history of the main switch 16 of the AV equipment 100. The learning operation described below may be executed triggered by the following state, for example. That is, the main switch detector section 30 detects that the main switch is turned on (the above-mentioned Step S105, Step S107, Yes). Detecting that the main switch of the AV equipment 100 is turned on, the main switch detector section 30 notifies the startup controller section 34 of the detection result. Receiving the notification from the main switch detector section 30 (Step S105, Step S107, Yes), the startup controller section 34 starts the learning engine section 32, and instructs the learning engine section 32 to start the learning operation.

Figure 5:
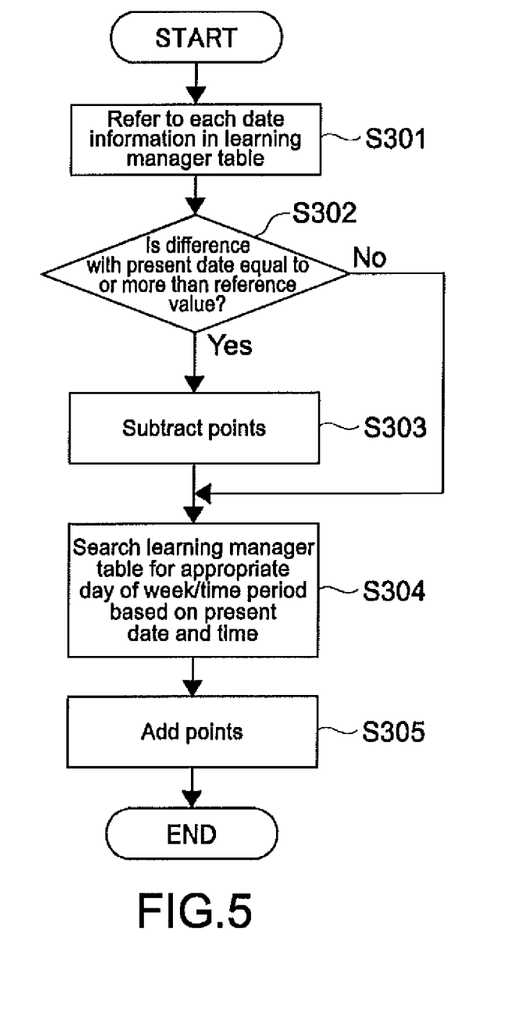
FIG. 5 is a flowchart showing a learning operation of the AV equipment.

FIG. 5 is a flowchart showing the learning operation of the AV equipment.

Receiving the instruction to start the learning operation from the startup controller section 34, the learning engine section 32 reads out the learning manager table 50 from the learning result storage section 33. Further, the learning engine section 32 refers to the timer 35, and obtains the present date and time information.

Figure 6:
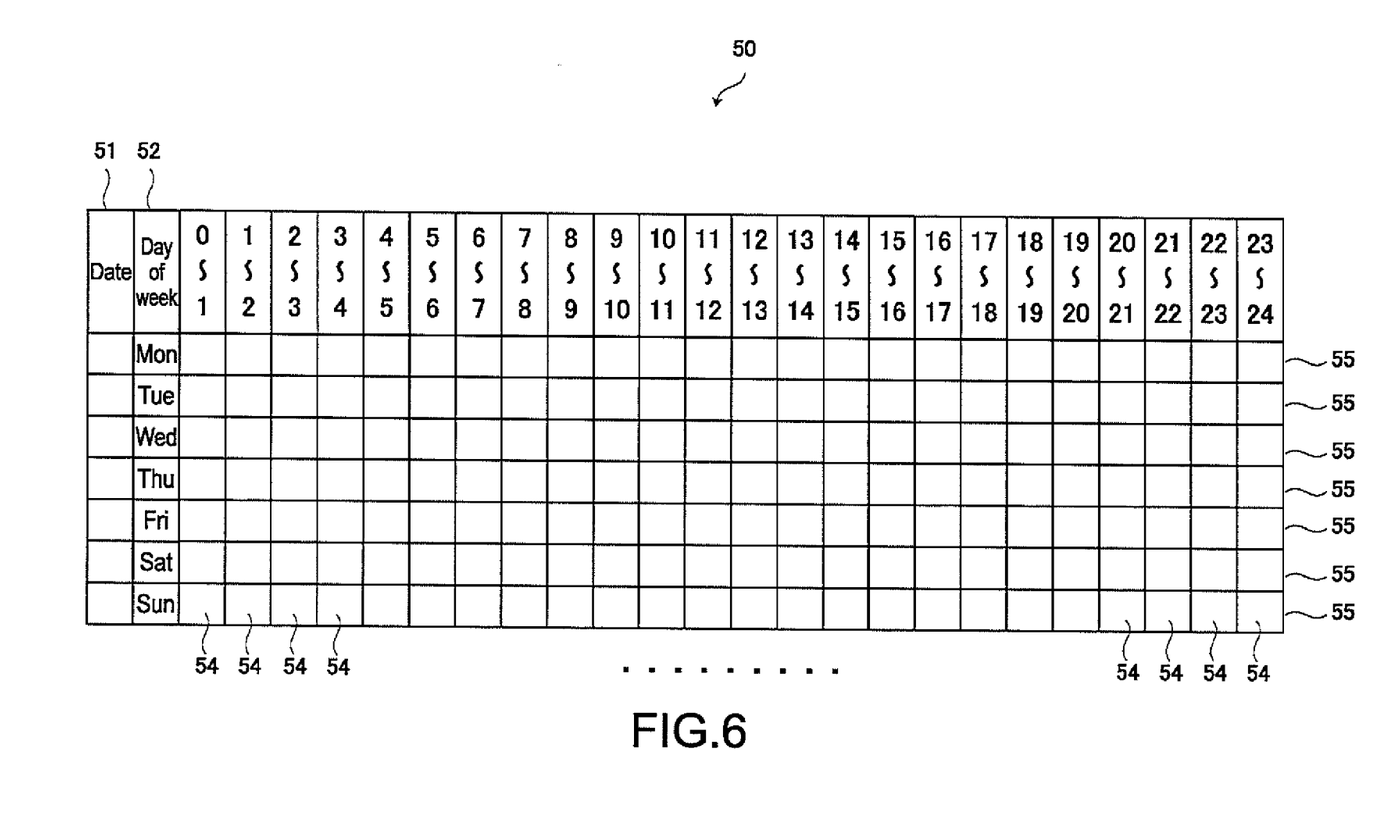
FIG. 6 is a diagram showing a learning manager table.

Here, the structure of the learning manager table 50 will be described.

FIG. 6 is a diagram showing a learning manager table.

The learning manager table 50 is a table including a date 51 and a plurality of slots 54. The date 51 records a date on which the main switch was turned on lastly for each day of a week 52 from Monday to Sunday. The plurality of slots 54 are respective time periods obtained by dividing one day into a plurality of equal time periods for each day of a week 52 from Monday to Sunday. In each slot 54, points, which are values corresponding to frequencies that the main switch is turned on, are recorded. More specifically, the learning manager table 50 includes twenty-four slots 54 ("0 o'clock to 1 o'clock" to "23 o'clock to 24 o'clock") corresponding to respective time periods obtained by dividing one day by the unit of one hour for each day of a week 52 from Monday to Sunday.

With reference to FIG. 5 again, the learning engine section 32 refers to, in the read-out learning manager table 50, seven values (date) registered in the fields of the date 51, respectively (Step S301). The learning engine section 32 calculates differences between the respective seven values (date) registered in the respective fields of the date 51 and the date obtained from the timer 35 (Step S302). The learning engine section 32 determines a field of the date 51 whose difference is the predetermined number of days (for example, seven days) or more. Here, the field of the date 51 whose difference is the predetermined number of days (for example, seven days) or more is a field that the predetermined number of days (for example, seven days) or more have been passed after the points are updated last time. In other words, each of the seven fields of the date 51 corresponds to any day of a week from Monday to Sunday. So, the field of the date 51 whose difference is the predetermined number of days (for example, seven days) or more may be a day of a week that the predetermined number of days (for example, seven days) or more have been passed after the points are updated last time for each day of a week.

The learning engine section 32 executes subtraction of all the points recorded in the plurality of slots 54 belonging to that day of a week (field) (Step S303). The subtraction of the points is, for example, executed by reducing the present point in half every time the predetermined number of days (for example seven days) pass.

After the learning engine section 32 subtracts the points, the learning engine section 32 rewrites the date of that day of a week (field) with the value of the date obtained from the timer 35. Subsequently, the learning engine section 32 searches a slot group 55 belonging to that day of a week (field)

for a slots 54 to which the time obtained from the timer 35 belongs (Step S304). The learning engine section 32 adds predetermined points (for example, 200 points) to the slot 54 (Step S305). The predetermined points are determined as addition points to the state where the main switch 16 is turned on.

After that, during a time period in which the main switch 16 is in the on-state, the learning engine section 32 adds predetermined points (for example, 100 point) to the slots 54 including the slot 54 to which the addition points to the state where the main switch 16 is turned on and slots 54 after that (Step S305). The predetermined points are determined as addition points to the state where the main switch 16 is in the on-state.

Note that, with respect to the field of the date 51 whose difference is less than the predetermined number of days (for example, seven days), subtraction of points are not executed. Instead, addition of the addition points to the state where the main switch 16 is turned on and addition of the addition points to the state where the main switch 16 is in the on-state are only executed.

Next, a specific example of the above-mentioned learning operation will be described with reference to FIGS. 7A, 7B, and 7C.

It is assumed a case where the main switch 16 is turned on between 1 o'clock and 2 o'clock of Monday, July 1, and turned off between 21 o'clock and 22 o'clock of the same day, and the main switch 16 is turned on on 2:23 of Monday, July 8. Further, it is assumed that the point subtracting method is subtraction by half, the addition points to the state where the main switch 16 is turned on are 200 points, and the addition points to the state where the main switch 16 is in the on-state are 100 points.

Figure 7A:
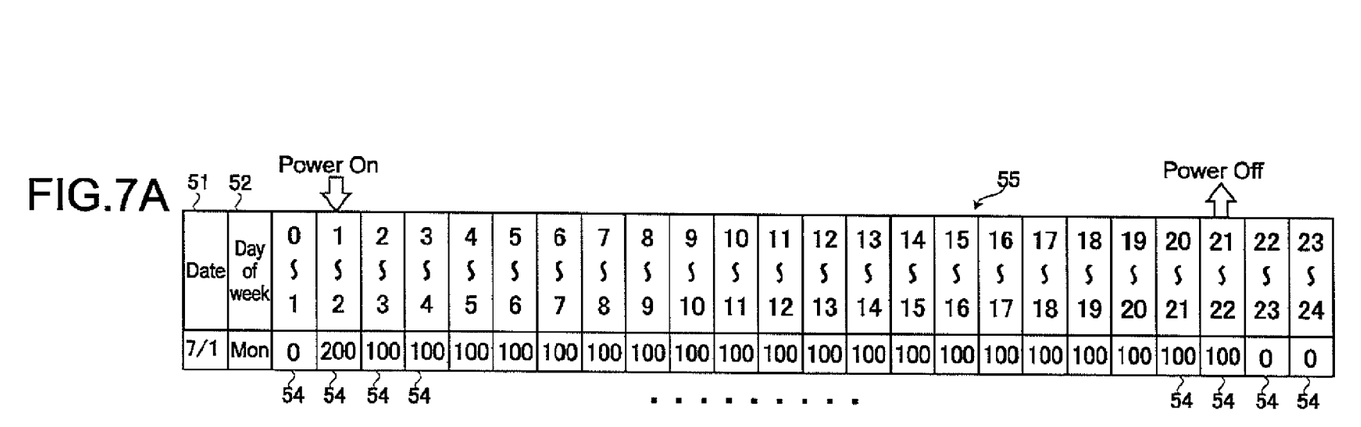
FIGS. 7A, 7B, and 7C are diagrams showing the learning operation.

FIG. 7A shows points in the slot group 55 belonging to the field of Monday, July 1. The learning engine section 32 registers "July 1" as a value of the date 51, adds 200 points to the slot "1 o'clock to 2 o'clock" as addition points to the state where the main switch 16 is turned on, and adds 100 points to the slots "2 o'clock to 3 o'clock" to "21 o'clock to 22 o'clock" as addition points to the state where the main switch 16 is in the on-state.

Figure 7B:
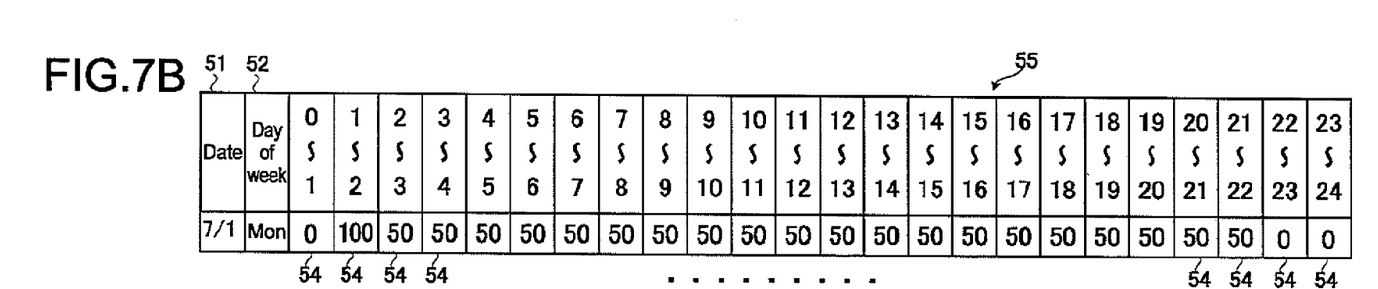

FIG. 7B shows a result of subtracting processing of the points in the slot group 55 belonging to the field of Monday, July 8, that is, seven days later. FIG. 7C shows a result of combination processing with respect to the point subtracting result of FIG. 7B. Further, it is assumed that the main switch 16 is turned on between 2 o'clock and 3 o'clock of Monday, July 8, and the on-state is maintained until the time between 21 o'clock and 22 o'clock of the same day.

In this case, the main switch 16 is turned on on Monday, July 8, and the learning engine section 32 is started as a result. The learning engine section 32 determines the field of Monday, July 1 as a field of the date 51 whose difference with the present date is the predetermined number of days (for example, seven days) or more.

Next, the learning engine section 32 reduces all the points recorded in the plurality of slots 54 belonging to the field of Monday, July 1 in half (see FIG. 7B). Subsequently, the learning engine section 32 rewrites the date of the day of a week (field) with the value of the date (July, 8) obtained by the timer 35. After that, the learning engine section 32 searches the slot group 55 belonging to that day of a week (field) for the slot 54 of 2 o'clock to 3 o'clock to which the time obtained from the timer 35 belongs. The learning engine section 32 adds 200 points to the slot 54 as the addition points to the state where the main switch 16 is turned on. As a result, the points in the slots 54 of 2 o'clock to 3 o'clock become "250".

Figure 7C:
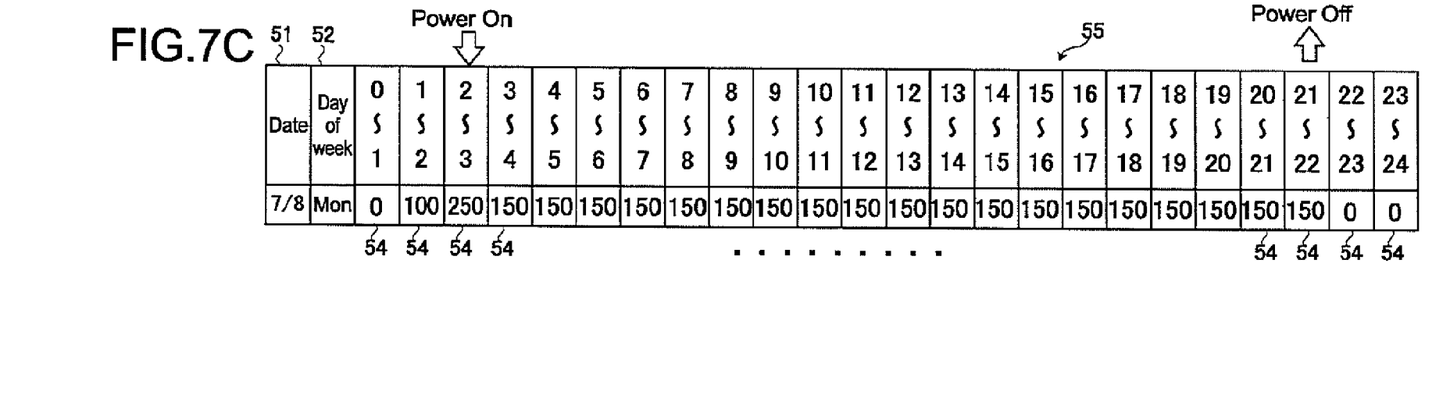

Further, because the on-state is maintained until the time between 21 o'clock to 22 o'clock, the learning engine section 32 adds 100 points to the respective points in the slots 54 from the slot 54 of 3 o'clock to 4 o'clock to the slot 54 of 21 o'clock to 22 o'clock as addition points to the state where the main switch 16 is in the on-state, respectively (see FIG. 7C).

Note that an upper limit (for example, 999 points) may be provided on the points in each slot 54. Further, addition of points may be executed irrespective of the quick setting mode and the normal startup mode being set.

Further, in the above-mentioned Step S203, the learning engine section 32 may predict a time period during which a possibility that the main switch 16 receives an on-instruction is high based on the learning manager table 50, and determine, for example, the start time of the predicted time period as a quick startup time as follows, for example. That is, the learning engine section 32 may select, for example, start times of time periods corresponding to the predetermined number (for example, six) of slots having higher points from the twenty-four slots 54 of the day of a week as quick startup times for each day of a week. In a case where there are the predetermined number or more of slots to be selected because there are a plurality of slots having the same points, the predetermined number of slots may be narrowed down by making an earlier slot a higher priority, for example. Further, instead of setting a start time of a time period corresponding to a slot as a quick startup time as it is, the learning engine section 32 may set a quick startup time as follows. That is, in expectation of a time necessary for processing to establish the state allowing communication with a connected apparatus, the learning engine section 32 may set a time the above-mentioned expected time earlier than a start time of a time period corresponding to a slot as a quick startup time.

Alternatively, the learning engine section 32 may combine points registered in the slot group 55 corresponding to each day of a week, and set a predetermined time of a day of a week whose total value is high as a quick startup time. For example, as described above, the learning engine section 32 may set a quick startup time for the unit of a day of a week.

Figure 8:
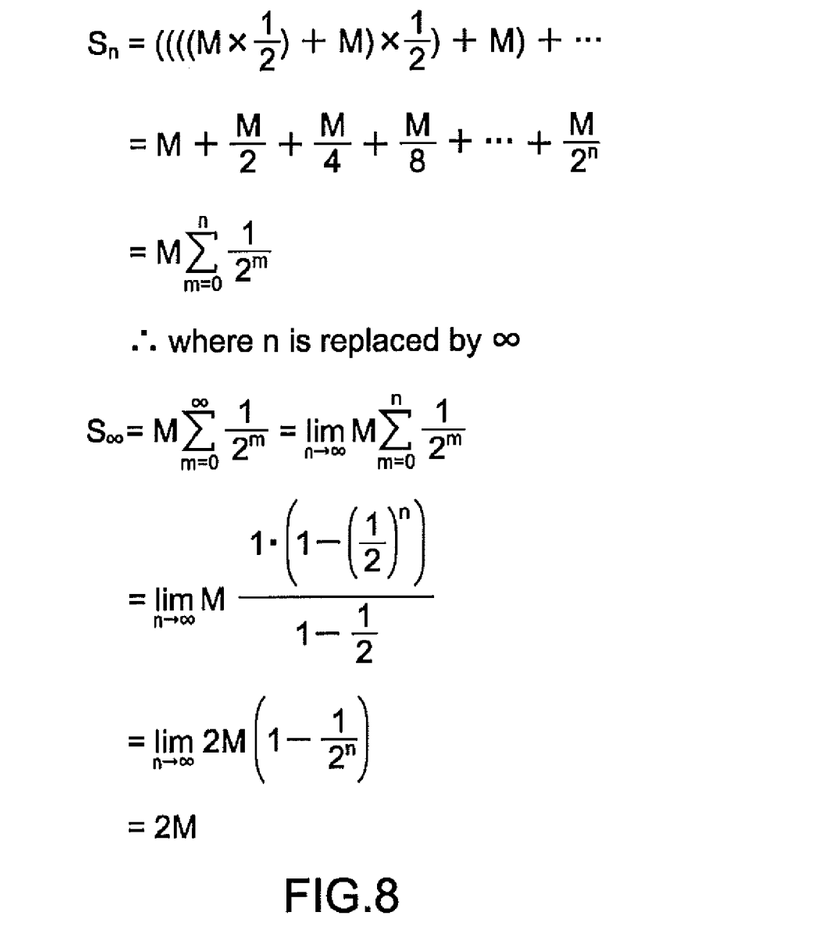
FIG. 8 shows expressions showing one example of point addition.

FIG. 8 shows expressions showing one example of point addition.

The expressions are expressions showing point addition in a case where the main switch is turned on in a time period corresponding to the same slot 54 every week. In the expressions, M is addition points, n is the number of startup, and S is total points. In this embodiment, M is equal to 200 (when main switch is turned on) or 100 (when main switch on-state is continued, when main switch is turned off). So, 2M is equal to 400 or 200. Therefore, for example, a start time or the like of a time period corresponding to a slot of 50 points or more, for example, may be selected as a quick startup time.

Figure 9:
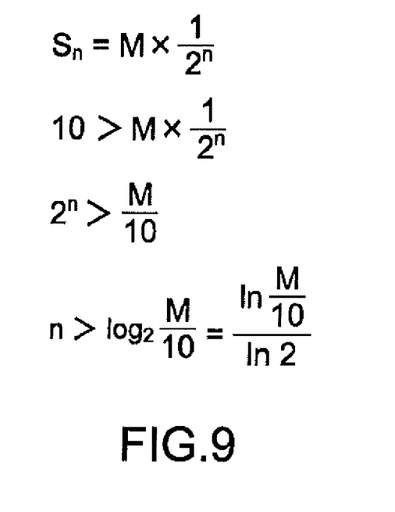
FIG. 9 shows expressions showing one example of point subtraction.

FIG. 9 shows expressions showing one example of point subtraction.

The expressions are expressions showing, in a case where a user turns on the main switch by mistake, the number of weeks that take until, for example, a start time or the like of a time period during which the main switch is turned on is not set as a quick startup time. In the expressions, M is addition points, n is the number of startup, and S is total points. Further, the minimum points selected as a quick startup time are 10. Here, in a case where M=200 points are added, n>4.32. That is, it takes 5 weeks until a start time or the like of a time period during which the main switch is turned on by mistake is not set as a quick startup time. In a case where M=100 points are added, n>3.32. That is, it takes 4 weeks until a start time or the like of a time period during which the main switch is turned on by mistake is not set as a quick startup time.

As described above, according to this embodiment, the following effects are obtained.

During a time period in which a possibility that the main switch 16 receives an on-instruction is high and when the main switch 16 is off, processing to establish a state allowing communication between the connected TV 200 and the AV equipment 100 is executed. As a result, after the main switch 16 actually receives an on-instruction, communication between the TV 200 and the AV equipment 100 may be started immediately. Further, during a time period from the establishment of the state allowing communication between the TV 200 and the AV equipment 100 to actually turning on the main switch 16, a black-screen signal is output to the TV 200. Therefore, during operation of the AV equipment 100, it appears that the AV equipment 100 is not operated through the display of the TV 200. When the main switch 16 is turned on, the output of the black-screen signal is stopped. Further, instead of the black screen, an original image screen is output to the TV 200. Therefore, the apparent startup speed is improved significantly.

Further, during a time period only in which a possibility that the main switch 16 receives an on-instruction is high, processing to establish the state allowing communication between the AV equipment 100 and the TV 200 may be performed and the black-screen signal may be output. Therefore, power consumption may be reduced. Note that it is assumed a case where a start time of a time period during which a possibility that the main switch receives an on-instruction is high is set as a quick startup time. In this case, the state allowing communication between the AV equipment 100 and the TV 200 may be reset at a finish time being the finish time of the time period, and the output of the black-screen signal may be stopped. It is assumed a case where a plurality of continuous time periods are time periods during which a possibility that the main switch receives an on-instruction is high. In this case, the state allowing communication between the AV equipment 100 and the TV 200 may be reset at the finish time of the plurality of continuous time periods, and the output of the black-screen signal may be stopped.

Further, points corresponding to frequencies that the main switch is turned on are calculated for each time period of each day of a week, and a time period during which a possibility that the main switch receives an on-instruction is high is predicted based on the points. Therefore, a time period during which a possibility that the main switch receives an on-instruction is high may be predicted for a shorter time unit. Further, needless setting of a state allowing communication with a connected apparatus and a state outputting a black-screen signal may be reduced to a minimum. Further, power consumption may be reduced more efficiently.

Further, the learning engine section 32 calculates a value corresponding to a frequency for each time period of a day of a week based on a relation between a difference between a date and time that the main switch was turned on last time and a date and time that the main switch was turned on lastly and a reference value by not only combining but also subtracting. Therefore, with respect to a case where the main switch 16 was not turned on for a long time, specifically, a more appropriate value may be obtained as a value corresponding to a frequency for each time period of each day of a week.

Second Embodiment

In the second embodiment described below, the AV equipment 100 executing a power-off operation different from the power-off operation described in the first embodiment will be described. In the following description, description of structures, functions, and the like similar to those of the first embodiment will be omitted or simplified, and different points are mainly described. In this embodiment, respective sections of the AV equipment 100 having similar structures of the respective sections of the AV equipment 100 of the first embodiment will be denoted by the same reference numerals, and, overlapping descriptions will be omitted.

(Power-Off Operation of AV Equipment)

Figure 10:
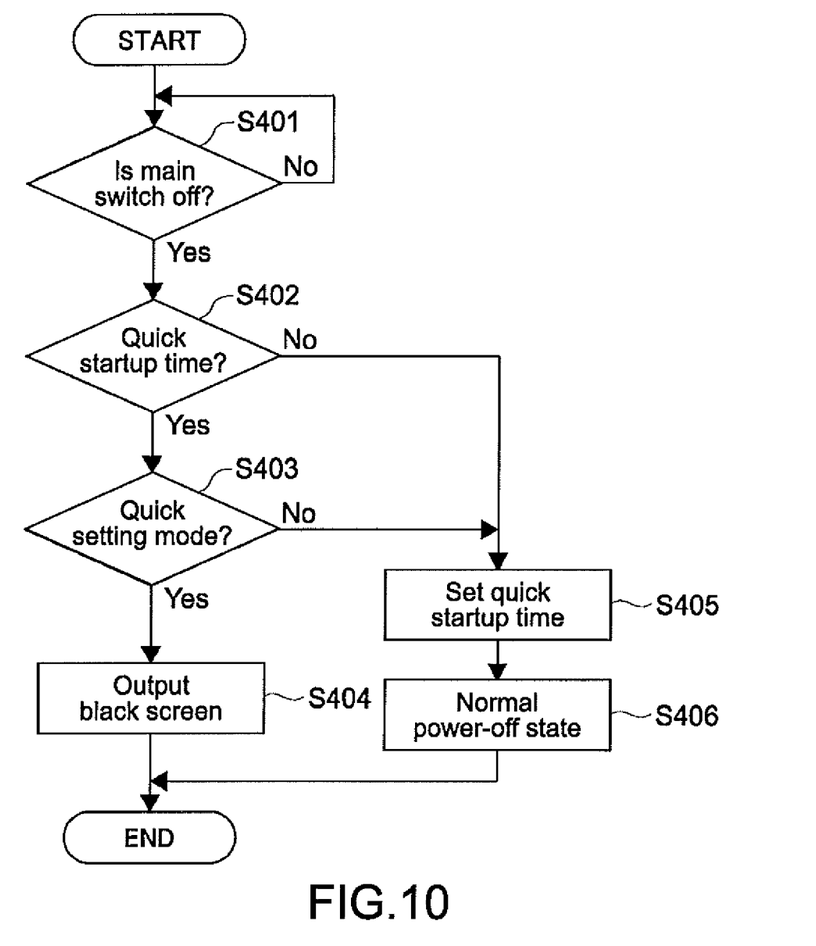
FIG. 10 is a flowchart showing a power-off operation of an AV equipment according to a second embodiment.

FIG. 10 is a flowchart showing a power-off operation of an AV equipment according to a second embodiment.

Detecting that the main switch 16 is turned off (Step S401, Yes), the main switch detector section 30 notifies the timer 35 of the detection result. Based on the notification from the main switch detector section 30, the timer 35 refers to the quick-startup-time storage section 39, and determines if the present date and time coincide with a quick startup time or not (Step S402). Determining that the present date and time coincide with the quick startup time (Step S402, Yes), the timer 35 instructs the startup controller section 34 to execute the quick startup.

Based on the startup instruction from the timer 35, the startup controller section 34 determines the presently-set standby mode (Step S403). Determining that the quick setting mode is set (Step S403, Yes), the startup controller section 34 instructs the display output controller section 31 to start to output a black-screen signal. Receiving the instruction to start to output a black-screen signal, the display output controller section 31 generates a black-screen signal, and supplies it to the HDMI interface 18 (Step S404). As a result, while securing the state allowing communication with the TV 200, the image output to the TV 200 is switched to the black-screen signal, and a black screen is displayed on the display of the TV 200.

Meanwhile, determining that the present date and time do not correspond to the quick startup time (Step S402, No), the timer 35 instructs the learning engine section 32 to read out the learning manager table 50. Based on the instruction, the learning engine section 32 reads out the learning manager table 50 in the learning result storage section 33, determines a next quick startup time based on the read-out learning manager table 50, and notifies the timer 35 of the determined quick startup time. The timer 35 sets the next quick startup time notified by the learning engine section 32 in the quick-startup-time storage section 39 (Step S405).

After setting the next quick startup time in the quick-startup-time storage section 39, the timer 35 notifies the startup controller section 34 that setting of the quick startup time is completed. Receiving the notification that the quick startup time is set, the startup controller section 34 instructs the power controller section 36 to turn off the power. Based on the instruction, the power controller section 36 switches off the switch 38. As a result, the power-supply from the power source 37 to the respective sections on the board is stopped (Step S406).

Further, also in a case where the startup controller section 34 determines the normal startup mode (Step S403, No), similarly, the startup controller section 34 gives an instruction to read out the learning manager table 50 to the learning engine section 32. As a result, similar to the above, the timer 35 sets a next quick startup time in the quick-startup-time storage section 39 (Step S405), and power-supply from the power source 37 to the respective sections on the board is stopped (Step S406).

In short, according to this embodiment, in a case where the time when the main switch 16 is turned off is the quick startup time and the present standby mode is the quick setting mode, a black screen is output to the TV 200 while securing the state allowing communication with the TV 200. As a result, immediately after a user turns on the main switch 16 again, an original image screen is output to the TV 200 instead of the black screen. Therefore, also according to this embodiment, the apparent startup speed is improved significantly.

The present disclosure is not limited to the above-mentioned embodiments, but may be variously modified within the scope of technological thought of the present disclosure.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    a main switch configured to receive on/off-instructions for power supply from a user;
    a predicting section configured to predict a time period during which a possibility that the main switch receives an on-instruction is high;
    a connector section capable of connecting an electronic apparatus including a display screen;
    a communication establishing section configured to execute processing to establish a state allowing communication with an electronic apparatus connected to the connector section;
    a black-screen output section capable of outputting a black-screen signal to the electronic apparatus via the connector section; and
    a startup section configured
        to start, during a time period predicted by the predicting section and when the main switch is off, the communication establishing section and the black-screen output section, and
        to cause the black-screen output section to continue to output the black-screen signal until the main switch is turned on.

2. The information processing apparatus according to claim 1, wherein
    the predicting section is configured
        to manage an on/off operation history of the main switch, and
        to predict, based on the history, a time period during which a possibility that the main switch receives an on-instruction is high.

3. The information processing apparatus according to claim 2, wherein
    the predicting section is configured
        to calculate a value corresponding to a frequency that the main switch is turned on for at least each day of a week,
        to generate a history including the calculation result, and
        to predict, based on the history, a time period during which a possibility that the main switch receives an on-instruction is high.

4. The information processing apparatus according to claim 3, wherein
    the predicting section is configured
        to calculate a value corresponding to a frequency that the main switch is turned on for each time period of each day of a week,
        to generate a history including the calculation result, and
        to predict, based on the history, a time period during which a possibility that the main switch receives an on-instruction is high.

5. The information processing apparatus according to claim 4, wherein
    the predicting section is configured to calculate a value corresponding to a frequency for each time period of each day of a week, taking a difference between a date and time that the main switch was turned on last time and a date and time that the main switch was turned on lastly into consideration.

6. An information processing method, comprising:
    predicting, by a predicting section, a time period during which a possibility that a main switch receives an on-instruction is high;
    executing, during a predicted time period and when the main switch is off, by a communication establishing section, processing to establish a state allowing communication with a connected electronic apparatus;
    outputting, by a black-screen output section, a black-screen signal to the electronic apparatus; and
    causing the black-screen output section to continue to output the black-screen signal until the main switch is turned on.

* * * * *